United States Patent
Fewkes et al.

(10) Patent No.: US 6,602,601 B2
(45) Date of Patent: Aug. 5, 2003

(54) OPTICAL FIBER COATING COMPOSITIONS

(75) Inventors: Edward J. Fewkes, Horseheads, NY (US); Himanshu C. Shah, Painted Post, NY (US); Frederic C. Wagner, Horsehead, NY (US)

(73) Assignee: Corning Incorporated, Corning, NY (US)

( * ) Notice: Subject to any disclaimer, the term of this patent is extended or adjusted under 35 U.S.C. 154(b) by 104 days.

(21) Appl. No.: 09/747,480

(22) Filed: Dec. 22, 2000

(65) Prior Publication Data

US 2003/0099831 A1 May 29, 2003

(51) Int. Cl.⁷ .............................. C08F 2/46; B32B 1/00; G02B 6/16; G02B 6/22
(52) U.S. Cl. .................. 428/378; 428/380; 428/383; 522/90; 522/96; 522/71; 522/74; 522/75; 522/76; 522/77; 522/78; 522/79; 522/81; 522/82; 522/83; 526/204; 526/217; 385/141; 385/147
(58) Field of Search .................. 522/96, 77, 182, 522/71, 74, 75, 76, 78, 79, 80, 81–83; 385/141, 147; 428/378, 380, 383; 526/204, 217

(56) References Cited

U.S. PATENT DOCUMENTS

| | | |
|---|---|---|
| 3,644,394 A | 2/1972 | Gurney |
| 4,024,106 A | 5/1977 | Mader ................ 260/45.95 |
| 4,474,830 A | 10/1984 | Taylor |
| 4,482,204 A * | 11/1984 | Blyler et al. ............ 385/123 |
| 4,486,212 A | 12/1984 | Berkey |
| 4,569,966 A | 2/1986 | Piccirilli et al. ........... 524/589 |
| 4,581,165 A | 4/1986 | Frank et al. |
| 4,608,409 A | 8/1986 | Coady et al. |
| 4,609,718 A | 9/1986 | Bishop et al. |
| 4,629,287 A | 12/1986 | Bishop |
| 4,690,502 A | 9/1987 | Zimmerman et al. |
| 4,798,852 A * | 1/1989 | Zimmerman et al. ........ 522/96 |
| 4,921,880 A | 5/1990 | Lee et al. |
| 4,923,915 A | 5/1990 | Urruti ................ 524/102 |
| 4,962,992 A | 10/1990 | Chapin et al. |
| 5,104,433 A | 4/1992 | Chapin et al. |
| 5,111,524 A | 5/1992 | Schunk et al. ............ 385/102 |
| 5,165,543 A | 11/1992 | Heyda et al. ............ 206/400 |
| 5,188,864 A | 2/1993 | Lee et al. |
| 5,199,098 A | 3/1993 | Nolan et al. |
| 5,205,059 A | 4/1993 | Doll ................. 40/152 |
| 5,236,982 A | 8/1993 | Cossement et al. |
| 5,300,399 A | 4/1994 | Wilczak |
| 5,336,363 A | 8/1994 | Morita |
| 5,441,813 A | 8/1995 | Sano et al. ............ 428/375 |
| 5,446,821 A | 8/1995 | Nonaka et al. |
| 5,504,830 A * | 4/1996 | Ngo et al. ............ 385/123 |
| 5,539,013 A | 7/1996 | Eckberg et al. |
| 5,562,985 A | 10/1996 | Sano et al. ............ 428/375 |
| 5,643,665 A | 7/1997 | Saidi |
| 5,646,207 A | 7/1997 | Schell |
| 5,707,781 A | 1/1998 | Wilczak |
| 5,777,024 A * | 7/1998 | Killilea et al. ........... 427/327.2 |
| 5,804,311 A * | 9/1998 | Suwa et al. ............ 385/145 |
| 5,824,413 A | 10/1998 | Schell |
| 5,971,316 A | 10/1999 | Kim ................. 242/601 |
| 5,986,018 A | 11/1999 | Yamaguchi et al. ........ 525/455 |
| 6,011,080 A | 1/2000 | Daly et al. ............ 522/107 |
| 6,063,888 A * | 5/2000 | Yamaguchi et al. ........ 428/380 |
| 6,114,090 A * | 9/2000 | Wu et al. .............. 430/281.1 |
| 6,136,880 A * | 10/2000 | Snowwhite et al. ........ 428/378 |
| 6,187,835 B1 * | 2/2001 | Szum et al. ............ 428/30 |
| 6,317,553 B1 * | 11/2001 | Harper et al. ............ 385/128 |

FOREIGN PATENT DOCUMENTS

| | | |
|---|---|---|
| EP | 0824119 A2 | 2/1998 |
| WO | WO 96/11217 | 4/1996 |
| WO | WO98/37030 | 8/1998 |
| WO | WO 98/57902 | 12/1998 |
| WO | WO 00/64831 | 11/2000 |

OTHER PUBLICATIONS

"Ultraviolet Absorber", Hawley's Condensed Chemical Dictionary, copyright 1997, pp. 150, 821, 1152 and 1153.
Lowilite 22, "Ultraviolet Light Absorber for Plastics and Coatings", Great Lakes Chemical Corporation, 2–Hydroxy–4–n–octoxybenzophenone, CAS No. 1843–05–06; Jul. 9, 1996.
Plastics Additives Handbook, Stabilizers, Processing Aids, Plasticizers, Fillers, Reinforcements, Colorants for Thermoplastics, R. Gather and H. Muller, P.O. Klemchuk, copyright 1990; pp. 129–270.
Precise Color Communication; Minolta; 1994; pp. 18–19.
"Photostabilization of Polypropylene. II. Stabilizers and Hydroperoxides" D.J. Carlsson and D.M. Wiles; Journal of Polymer Science: Polymer Chemistry Edition; vol. 12, pp. 2217–2233(1974).
"Photo–oxidation of Polypropylene Films. VI. Possible UV–stabilization Mechanisms" D.J. Carlsson, T. Suprunchuk and D.M. Wiles; Journal of Applied Polymer Science; vol. 16, pp. 615–626 (1972).
"A Breakthrough in Yellowing Inhibition of Mechanical Pulp"; TAPPI Proceedings—1999 International Mechanical Pulping Conference; P. McGarry, et al; 1999; pp. 183–192.
"Chromatographic Determination of UV Absorbers in Car Paints" J. Liq. Chrom. & Rel. Technol.; M.C. Gennaro, et al; 1999; pp. 2689–2700.

(List continued on next page.)

Primary Examiner—James J. Seidleck
Assistant Examiner—Sanza L. McClendon
(74) Attorney, Agent, or Firm—Timothy R. Krogh; James V. Suggs

(57) ABSTRACT

The disclosed invention includes a composition for an optical fiber coating. The cured composition includes at least one monomer and at least one compound from the following group of compounds that consist of an ultra-violet light absorber, a hindered amine light stabilizer, and an optical brightener. The invention also includes an optical fiber coated with the inventive coating.

15 Claims, 10 Drawing Sheets

OTHER PUBLICATIONS

"Next Generation UV Absorbers for Plastics"; AddCon '95: Worldwide Additives & Polymer Modifiers Conference; Paper No. 6; R.D. Cody, et al; Apr. 5–6, 1995; pp. 1–5.

"Milestones in Auto Emissions Control"; EPA Fact Sheet OMS–12; Aug. 1994.

"Use of Fluorescent Agents as Photo–oxidative Process Inhibitors", Leclerc, Eric; Pretires—Conf. Technol. Estivale 2000 (2000), pp. 69–76.

Kokai Patent Application No. HEI 5[1993]–271618, Application Date Mar. 30, 1992, Publication Date Oct. 19, 1993.

"Additives for Trade Sales and Industrial Coatings"; Formulators Guide, Ciba, pp. 37 and 40.

"Color Systems", Chroma Meter CR–300/CR–310/CR–331, Minolta, pp. 77–80.

* cited by examiner

OPTICAL FIBER COATING COMPOSITIONS

BACKGROUND OF THE INVENTION

1. Field of the Invention

The present invention relates generally to optical fibers (hereinafter fiber), and particularly to fiber coatings.

2. Technical Background

Fiber has acquired an increasingly important role in the field of telecommunications, frequently replacing existing copper wires. This trend has had a significant impact in all areas of telecommunications, which has seen a vast increase in the usage of fiber. Further increases in the use of fiber is at least foreseen in local loop telephone and cable TV service, as local fiber networks are established to deliver ever greater volumes of information in the form of data, audio, and video signals to residential and commercial users. In addition, use of fiber in home and commercial business environments for internal data, voice, and video communications has begun and is expected to increase.

Fibers typically contain a glass core and at least two coatings, e.g. a primary (or inner) coating and a secondary (or outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled. The secondary coating is applied over the primary coating and functions as a tough, protective outer layer that prevents damage to the glass fiber during processing and use.

Exposure of the fiber to light has caused the appearance of the fiber to change from white or a translucent color to a yellow color. This phenomenon is known as photo-yellowing of the fiber. Photo-yellowing can cause problems with fiber identification, particularly in dimly lit places such as a manhole. Fiber covered with a lighter colored ink, such as light blues (aqua), yellows, or greens, tend to appear as a brown color as the fiber undergoes photo-yellowing.

A need exists to prevent a coated fiber from yellowing.

SUMMARY OF THE INVENTION

One aspect of the present invention relates to a coating composition for an optical fiber. The composition includes at least one UV curable monomer, at least one photoinitiator, and at least one ultra-violet light absorber. The inventive coating composition may be applied to an optical fiber to form at least one of the coatings applied to the fiber.

A second aspect of the invention relates to a coating composition for an optical fiber. The composition includes at least one UV curable monomer, at least one photoinitiator, and at least one hindered amine light stabilizer. A third aspect of the invention relates to a coating composition for an optical fiber which includes at least one UV curable monomer, at least one photoinitiator, and at least one optical brightener.

The present invention has the advantage of preventing the photo-yellowing of the coatings applied to an optical fiber. The present invention also improves the ability of a technician to identify the fiber that has been stored in a dimly lit location.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
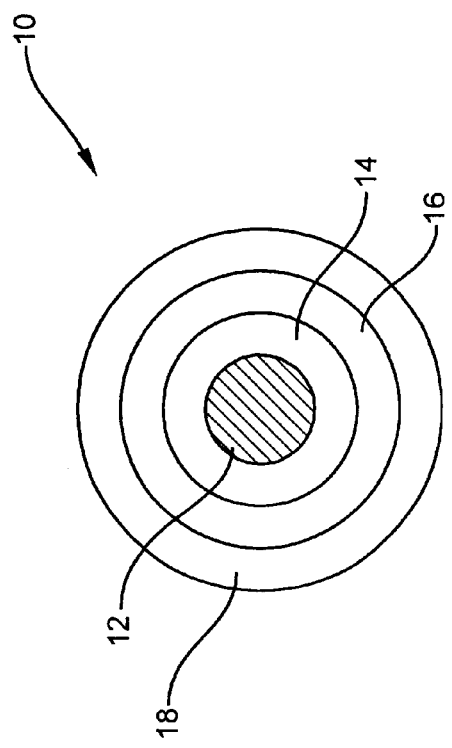
FIG. 1 is a cross sectional view of a coated optical fiber.

Reference will now be made in detail to the present preferred embodiments of the invention, an example of which is illustrated in the accompanying drawings. Wherever possible, the same reference numbers will be used throughout the drawings to refer to the same or like parts. An exemplary embodiment of the optical coating of the present invention is shown in FIG. 1, and is designated generally throughout by reference numeral 10.

The present invention relates to compositions for optical fiber coatings. The compositions include at least one component to prevent the photo-yellowing of the coating once the coating has been applied to an optical fiber (hereinafter "fiber"), cured, and subsequently exposed to ultra-violet (hereinafter "UV") light. UV light is defined herein to mean light having a wavelength of about 400 nm or less. The inventive optical fiber coating should include at least one constituent from the group consisting of UV light absorbers, hindered amine light stabilizers, and optical brighteners.

UV ABSORBERS

Suitable absorbers may be any chemical compound that will prohibit the transmittance of a sufficient amount of UV light to cause the photo-yellowing of a coated fiber. It is preferred that the absorber prevents the transmission of an amount of UV light necessary to photo-yellow the coating applied to the fiber, thereby preventing the fiber coating from yellowing. It is more preferred that the absorber absorbs light of the aforementioned wavelength (about 400 nm or less) and otherwise prevents photo-yellowing degradation of the fiber coating to occur. It is most preferred that the absorber is a compound which absorbs the UV light and converts the UV light into heat.

Preferred absorbers include triazoles, substituted acrylonitriles, phenol-nickel complexes, and benzophenones. More preferred absorbers include benzotriazoles such as 2-(2'-hydroxy-5'methylphenyl)-benzotriazole (commercially available as Tinuvin® P from Ciba, Tarrytown, N.Y.), 2-(3'-5'-di-tert-butyl-2'-hydroxyphenyl)-5-chlorobenzotriazole (commercially available as Tinuvin®, 327 from Ciba), 2(2'-hydroxy-3'-5'-di-tert-amylphenyl) benzotriazole (Commercially available as Tinuvin® 328 from Ciba), benzenepropanoic acid, 3-(2H-benzotriazol-2-yl)-5-(1,1-dimethyl ethyl)-4-hydroxy-, C7–9 branched alkyl esters (commercially available as Tinuvin® 384 from Ciba), 2-(3',5'-bis(1-methyl-1-phenylethyl)-2'-hydroxyphenyl) benzotriazole (commercially available as Tinuvin® 900 from Ciba), 2-[2-hydroxy-3-dimethylbenzylphenyl-5-(1,1,3,3-tetramethylbutyl)]-2H-benzotriazole (commercially available as Tinuvin® 928), a mixture of poly (oxy-1,2-ethanediyl), α-[3-[3-(2H-benzotriazol-2-yl)-5-(1,1-dimethylethyl)-4-hydroxyphenyl]-1-oxopropyl]-ω-hydroxy and poly(oxy-1,2-ethanediyl), α-[3-[3-(2H-benzotriazol-2-yl)-5-(1,1-dimethylethyl)-4-hydroxyphenyl]-1-oxopropyl]-ω-[3-[3-(2H-benzotriazol-2-yl)-5-(1,1-dimethylethyl)-4-hydroxyphenyl]-1-oxopropyl]-(commercially available as Tinuvin® 1130 from Ciba), and 2-[4-[2-hydroxy-3-tridecyl oxypropyl]oxy]-2-hydroxyphenyl]-4,6-bis(2,4-dimethylphenyl)-1,3,5-triazine and 2-[4-[2-hydroxy-3-dodecyl oxypropyl]oxy]-2-hydroxyphenyl]-4,6-bis(2,4-dimethylphenyl)-1,3,5-triazine (commercially available as Tinuvin® 400 from Ciba). An example of a preferred benzophenone is 2-hydroxy-4-(N-octoxy) benzophenone (commercially available as Lowilite® 22 from Great Lakes Chemical Corp. of West Lafayette, Ind.).

Additional more preferred absorbers include p-methoxycinnamic acid 2-ethylhexyl ester stabilized with butylated hydroxy toluene (hereinafter "BHT") (commercially available as Uvinul MC 80 from BASF of Mount Olive, N.J.), p-methoxycinnamic acid 2-ethylhexyl ester unstabilized (commercially available as Uvinul MC 80 N from BASF), 2-cyano-3,3-diphenylacrylic acid 2'-ethylhexyl ester (commercially available as Uvinul 539 T from BASF), 2-hydroxy-4-(N-octoxy) benzophenone (commercially available as Cyasorb UV-501 from Cytec of West Paterson, N.J.), 2-(2'-hydroxy-3'-5'-di-t-amylphenyl) benzotriazole (commercially available as Cyasorb UV-2337 from Cytec), and 2-(2-hydroxy-5-t-octylphenyl) benzotriazole (commercially available as Cyasorb UV-5411 PA from Cytec).

Preferably the particular coating composition includes the absorber in an amount of no more than about 1.0 pph, more preferably no more than about 0.5 pph. It is further preferred that the amount of absorber in the coating does not inhibit the rate of cure of the coating composition.

HINDERED AMINE LIGHT STABILIZERS

Hindered amine light stabilizers (a.k.a. HALS), unlike absorbers, do not absorb UV radiation, instead the stabilizers scavenge free radicals. The stabilizers have exhibited excellent efficiency and longevity. The stabilizers in the coating are oxidized to form nitroxyl radicals (NO*) which in turn react with free radicals, R*, present in the coating. The free radicals are formed from the photo-degradation of the coating upon exposure of the coating to UV light. The free radical may react with oxygen present in the coating to form a peroxyl radical, R'—OO*. The reaction products of the free radicals and nitroxyl radicals are a hindered aminoethers (N—OR), non-radical species. The aminoethers can terminate the peroxy radicals and regenerate the nitroxyl species. The above reactions can also be described with the below chemical reactions:

(1) Free Radical Formation: UV→R→R*;
(2) Peroxyl Formation: R*+$O_2$→R'—OO*;
(3) Nitroxyl Radical Formation: —N—$CH_3$+O→—N—O*;
(4) Aminoether Formation: —N—O*+R*→N—OR; and
(5) Regeneration of Nitroxyl Radical: N—OR+R'OO*→R'—OH+R=O+N—O*

For additional information regarding free radical scavengers chapter 3 of the *Plastics Additives Handbook* and the Denisov cycle are incorporated herein by reference.

In comparing a stabilizer to an absorber, the absorber will prevent photo-degradation by filtering out light of the unwanted wavelengths, whereas, the stabilizer will trap the free radical to prevent further photo-degradation. An advantage of using the stabilizer in place of an absorber is that the stabilizer will not interfere with the curing process by competing for the UV light required to initiate polymerization of the coating material.

Examples of preferred hindered amine light stabilizers includes decanedioic acid, bis(2,2,6,6-tetramethyl-4-piperidinyl) ester (commercially available as Tinuvin® 123 from Ciba ($pK_b$ of 9.6)), bis(1,2,2,6,6-pentamethyl-4-piperidinyl)(3,5-di-tert-butyl-4-hydroxybenzyl) butylpropanedioate (commercially available as Tinuvin® 144 from Ciba ($pK_b$ of 5.1)). Preferred substituted sebacates include bis(2,2,6,6-tetramethyl-4-piperidyl) sebacate (commercially available as Tinuvin® 770 from Ciba ($pK_b$ of N/A)) and bis(1,2,2,6,6-pentamethyl-4-piperidinyl) sebacate and methyl 1,2,2,6,6-pentamethyl-4-piperidinyl sebacate (commercially available as Tinuvin® 292 from Ciba ($pK_b$ of 5.5)). More preferred HALS are those compounds which have a $pK_b$ of at least about 5.0, more preferably at least about 6.0, and most preferably at least about 7.0.

The $pK_b$ is the negative logarithm of the equilibrium constant of the disassociation reaction of the stabilizer in terms of a base hydrolysis reaction. For example, the reaction of stabilizer B and water is $B+H_2O \leftrightharpoons BH^+ + OH^-$, the pKb is calculated as follows: $-\log ([BH^+]^* [OH^-]/[B])$. "[$BH^+$]" is the concentration of the $BH^+$ cation in solution, "[$OH^-$]" is the concentration of the hydroxyl ion in solution, and "[B]" is the concentration of the stabilizer in solution.

Typically, the coating may only include no more than about 2 pph of the stabilizer, preferably no more than about 1 pph, more preferably no more than about 0.5 pph, and most preferably less than about 0.2 pph. Optical fibers which have been coated with a coating including the stabilizer in the above concentrations have not exhibited any noteworthy decrease in fiber strength, which was one prior drawback of using a stabilizer in coating to be applied to a glass fiber.

A coating composition which includes at least one hindered amine light stabilizer may also optionally include at least one absorber. Preferably, the coating composition does include at least one absorber. If the coating composition includes both at least one absorber and at least one stabilizer, preferably, the concentration of the stabilizer is about half (½) the concentration of the absorber. For example, if a coating composition included about 0.5 pph of an absorber, preferably, the composition of the stabilizer would be about 0.25 pph. Also, preferably, a coating which includes the stabilizer does not include a hindered phenol derivative.

OPTICAL BRIGHTENERS

Suitable brighteners may be any chemical compound that will absorb a light wavelength of about 450 nm or less and emit the light at a higher wavelength such as a wavelength of about 550 nm or less, preferably about 525 nm or less. More preferably, the light emitted is in the blue region of the visible spectrum, this being light having a wavelength of at least about 400 nm and up to about 525 nm. Most preferably, the light emitted is no more than about 500 nm.

Benzoxazole derivatives are one example of a class of compounds that are suitable optical brighteners. Preferred optical brighteners include 2,2'-(2,5-thiophenediyl) bis [5-tert-butylbenzoxazole](ommercially available as Uvitex® OB from Ciba), benzoxazole derivatives such as Blankophor® KLA (from Bayer of Pittsburgh, Pa.), Hostalux® KCB (from Clariant of Muttenz, Switzerland), or Hostalux® KCU (from Clariant). An example of an additional preferred brightener is 4,4'-bis(2-benzoxazolyl) stilbene (commercially available as Eastobrite® OB-1 from Eastman of Kingsport, Tenn.).

Classes of other compounds which are suitable optical brighteners includes derivatives of 4,4'-diminostilbene-2–2'-disulfonic acid, coumarin derivatives, such as but not limited to, 4-methyl-7-diethylaminocoumarin, and the family of bis-(styryl) biphenyls.

Preferably, the concentration of the optical brightener in the coating composition is no more than about 0.2 pph and at least about 0.010 pph. More preferably, the concentration is no more than about 0.15 pph and most preferably about 0.10 pph. Preferably, a coating which includes the brightener does not include an organic binder such as styrene/maleic anyhydride copolymers and their half esters, acrylic polymers and copolymers, polyamides, polyvinyl pyrrolidones, cellulosic resins, phenolic resins, polyvinyl acetals, or polyvinyl acetates and their copolymers. Optionally, the brightener may be included in a coating formulation that includes either an absorber, a stabilizer, or both.

Shown in FIG. 1 is a cross sectional view of a coated optical fiber 10. Referring to FIG. 1, the optical fiber 10 includes a glass core 12, a cladding layer 14 surrounding and adjacent to glass core 12, a primary coating material 16 which adheres to cladding layer 14, and one or more secondary (or outer) coating materials 18 surrounding and adjacent to the primary coating material 16. The components of the optical fiber of the present invention can optionally include a coloring material, such as a pigment or dye, or an additional colored ink coating surround coating 18.

Any conventional material can be used to form glass core 12, such as those described in U.S. Pat. No. 4,486,212 to Berkey, which is hereby incorporated by reference. The core is typically a silica glass having a cylindrical cross section and a diameter ranging from about 5 to about 10 $\mu$m for single-mode fibers and about 20 to about 100 $\mu$m for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

Cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form cladding layer 14 in the optical fiber of the present invention.

The above coating components of an absorber, a stabilizer, or an optical brightener may be incorporated into coating 16, coating 18, or an ink layer. Coatings 16 and 18 are not thermoplastics. Nor do coatings 16 and 18 exhibit the properties of a thermoplastic resin, that the resin may be reversibly heated, melted, and reformed. Coatings 16 and 18 are typically crosslinked coatings. A preferred component of the primary coating composition of the present invention is an oligomer. Preferably the oligomer is an ethylenically unsaturated oligomer, more preferably a (meth)acrylate oligomer. By (meth)acrylate, it is meant an acrylate or a methacrylate. The (meth)acrylate terminal groups in such oligomers may be provided by a monohydric poly(meth)acrylate capping component, or by a mono(meth)acrylate capping component such as 2-hydroxyethyl acrylate, in the known manner. It is also preferred that the oligomer is capable of participating in addition polymerization. It is further preferred that the oligomer includes at least one urethane functional group, at least one epoxy functional group, or both.

Urethane oligomers are conventionally provided by reacting an aliphatic or aromatic diusocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference, describe such syntheses of the oligomers in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

Thus, it is desirable for the primary coating composition of the present invention to contain at least one ethylenically unsaturated oligomer, although more than one oligomer component can be introduced into the composition. Preferably, the oligomer(s) is present in an amount between about 10 to about 90 percent by weight, more preferably between about 35 to about 75 percent by weight, and most preferably between about 40 to about 65 percent by weight.

Suitable ethylenically unsaturated oligomers for primary coatings include polyether urethane acrylate oligomers (e.g., CN986 available from Sartomer Company, Inc., (West Chester, Pa.)) and BR3731 and STC3-149 available from Bomar Specialty Co. (Winstead, Conn.)), acrylate oligomers based on tris(hydroxyethyl)isocyanurate, (available from Sartomer Company, Inc.), (meth)acrylated acrylic oligomers, (available from Cognis (Ambler, Pa.), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690, 502 and 4,798,852 to Zimmerman et al., U.S. Pat. No. 4,609,718 to Bishop, and U.S. Pat. No. 4,629,287 to Bishop et al., all of which are hereby incorporated by reference), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., the specifications of which are hereby incorporated by reference), epoxy acrylate oligomers (e.g., CN120 available from Sartomer Company, Inc., and Ebecryl 3201 and 3604 available from UCB Radcure), hydrogenated polybutadiene oligomers (e.g., Echo Resin MBNX available from Echo Resins and Laboratory (Versailles, Mo.)), and combinations thereof.

Furthermore, the coating compositions of the invention will typically include at least one monomer component. Preferably, the monomer is an ethylenically unsaturated monomer, more preferably a (meth)acrylate monomer. Generally, suitable monomers are those for which the resulting homopolymer would have a glass transition temperature ($T_g$) of at most about 20° C., preferably at most about 10° C. Generally, a lower molecular weight (i.e., preferably less than about 2000, more preferably about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional methacrylates may also be employed.

When it is desirable to utilize moisture-resistant components, the monomer component will be selected on the basis of its compatibility with the selected moisture-resistance oligomer. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the primary coating composition to contain at least one ethylenically unsaturated monomer, although more than one monomer can be introduced into the composition. Preferably, the ethylenically unsaturated monomer is present in an amount between about 10 to about 90 percent by weight, more preferably between about 20 to about 60 percent by weight, and most preferably between about 25 to about 45 percent by weight.

Suitable ethylenically unsaturated monomers include lauryl acrylate (e.g., SR335 available from Sartomer Company, Inc., Ageflex FA12 available from CPS Chemical Co. (Old Bridge, N.J.), and Photomer 4812 available from Cognis f.k.a. Henkel (Ambler, Pa.)), ethoxylatednonylphenol acrylate (e.g., SR504 available from Sartomer Company, Inc. and Photomer 4003 available from Cognis), caprolactone acrylate (e.g., SR495 available from Sartomer Company, Inc., and Tone M100 available from Union Carbide Company (Danbury, Conn.)), phenoxyethyl acrylate (e.g., SR339 available from Sartomer Company, Inc., Ageflex PEA available from CPS Chemical Co., and Photomer 4035 available from Cognis), isooctyl acrylate (e.g., SR440 available from Sartomer Company, Inc. and Ageflex FA8 available from CPS Chemical Co.), tridecyl acrylate (e.g., SR489 available from Sartomer Company, Inc.), phenoxyglycidyl acrylate (e.g., CN131 available from Sartomer Company, Inc.), lauryloxyglycidyl acrylate (e.g., CN130 available from Sartomer Company, Inc.), isobornyl acrylate (e.g., SR506 available from Sartomer Company, Inc. and Ageflex IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), and combinations thereof.

Optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, chemical initiators, electron beam initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. As measured in a dose versus modulus curve, a cure speed for coating thickness' of about 25–35 $\mu$m is, e.g., less than 1.0 J/cm$^2$, preferably less than 0.5 J/cm$^2$.

Suitable photoinitiators include 1-hydroxycyclohexylphenyl ketone (e.g., Irgacure 184 available from Ciba Specialty Chemical (Hawthorne, N.Y.), (2,6-dimethoxybenzoyl)-2,4,4-trimethylpentyl phosphine oxide (e.g., commercial blends Irgacure 1800, 1850, and 1700 available from Ciba Specialty Chemical), 2,2-dimethoxyl-2-phenyl acetophenone (e.g., Irgacure 651, available from Ciba Specialty Chemical), bis(2,4,6-trimethyl benzoyl)phenyl-phosphine oxide (Irgacure 819), (2,4,6-trimethylbenzoyl)diphenyl phosphine oxide (Lucerin TPO, available from BASF (Munich, Germany)), ethoxy (2,4,6-trimethylbenzoyl)phenyl phosphine oxide (Lucerin TPO-L from BASF), and combinations thereof.

As used herein, the weight percent of a particular component in coating 16, coating 18, or the ink refers to the amount introduced into the bulk composition excluding the adhesion promoter and other additives. The amount of adhesion promoter and various other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

The coating composition may also include an adhesion promoter. It is preferred that the adhesion promoter includes a compound containing a cyclic structure interposed between at least two reactive silanes which are independently an alkoxysilane or a halosilane.

The cyclic structure can be a hydrocarbon cyclic structure or a heterocyclic structure or a combination thereof. Hydrocarbon cyclic structures and heterocyclic structures can be single-ring, fused-ring, or multi-ring structures, with or without hydrocarbon or hetero-substituents. Suitable hydrocarbon cyclic structures include, but are not limited to, cycloalkanes, preferably containing between 3 to 10, more preferably 5 to 6 carbon atoms per cyclic structure; cycloalkenes, preferably containing between 3 to 10, more preferably 5 to 6 carbon atoms per cyclic structure; cycloalkyldienes, preferably containing between 3 to 10, more preferably 5 to 6 carbon atoms per cyclic structure; substituted aliphatic rings; aromatic rings; and substituted aromatic rings. Preferably the hydrocarbon cyclic structure is an aromatic ring or a substituted aromatic ring. Exemplary hydrocarbon cyclic structures include, but are not limited to, benzene, naphthalene, cyclohexane, cyclohexene, etc. Suitable heterocyclic structure include those which contain oxygen, nitrogen, sulfur, or phosphorous hetero atom(s) within the ring structure. Exemplary heterocyclic structures include, but are not limited to, pyridines, pyrroles, imidazoles, indoles, pyrimidines, pyrrolidines, piperidines, furans, thiophenes, etc.

The at least two reactive silanes can independently be an alkoxysilane, a dialkoxysilane, a trialkoxysilane or any other suitable polyalkoxysilane, a halosilane, a dihalosilane, or a trihalosilane. Preferably, the at least two reactive silanes are independently dialkoxysilanes, trialkoxysilanes, or trihalosilanes. Suitable alkoxysilanes, polyalkoxysilanes, dialkoxysilanes, and trialkoxysilanes include alkoxy groups independently having between 1 and 6 carbon atoms. A preferred halosilane is a chlorosilane, more preferably a trichlorosilane.

The compound can also include a substituent interposed between the cyclic structure and one (or more) of the at least two alkoxysilanes. Suitable substituents include straight-chain alkylene groups having between 1 and 12 carbon atoms; branched-chain alkylene groups having between 1 and 12 carbon atoms; straight and branched-chain alkylene groups having a heterogroup; and a heterogroup including, but not limited to, oxygen, nitrogen, sulfur, phosphorous, selenium, titanium, zirconium, and silicon.

Preferred compounds include bis(trimethoxysilylethyl) benzene and bis(triethoxysilylethyl)benzene. Bis (trimethoxysilylethyl)benzene is commercially available from Gelest (Tellytown, Pa.), Archimica (Wilmington, Del.), and United Chemical Technologies, Inc. (Bristol, Pa.). Bis (triethoxysilylethyl)benzene can be synthesized from bis (trimethoxysilylethyl)benzene by trans-esterification with ethanol.

Preferably the adhesion promoter is present in an amount between about 0.1 to about 10 parts per hundred, more preferably between about 0.25 to about 4 parts per hundred, most preferably between about 0.5 to about 3 parts per hundred.

As used herein, the weight percent of a particular component refers to the amount introduced into the bulk composition excluding the adhesion promoter and other additives. The amount of adhesion promoter and various other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

In addition to the above-described components, the primary coating composition of the present invention can optionally include any number of additives, such as reactive diluents, antioxidants, catalysts, lubricants, co-monomers, low molecular weight non-crosslinking resins, and stabilizers. Some additives (e.g. chain transfer agents, for example) can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is thiodiethylene bis(3,5-di-tert-butyl)-4-hydroxyhydrocinnamate (e.g., Irganox 1035, available from Ciba Specialty Chemical). However, an antioxidant is not required in the composition to practice the invention.

A preferred co-monomer is the polar monomer N-vinyl-pyrrolidone available from International Specialty Products (Wayne, N.J.).

The coating composition may include an oligomer capable of being polymerized, a monomer suitable to control the viscosity of the composition, an adhesion promoter that includes a compound containing at least one reactive silane, and a carrier.

The carrier is preferably a carrier which functions as a carrier surfactant or ambiphilic reactive or non-reactive surfactant. Reactive surfactants which are partially soluble or insoluble in the composition are particularly preferred. Without being bound to a particular theory, it is believed that carriers which function as reactive surfactants interact with the compound containing a reactive silane by depositing such compounds on the glass fiber, where it is allowed to react. It is desirable for the carrier to be present in an amount between about 0.01 to about 10 parts per hundred, more preferably about 0.25 to about 3 parts per hundred.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200, and reactive surfactant Tegorad 2700 (acrylated siloxane) also from Goldschmidt Chemical Co.

Other classes of suitable carriers are polyols and non-reactive surfactants. Examples of suitable polyols and non-reactive surfactants include polyol Aclaim 3201 (poly (ethylene oxide-co-propylene oxide)) available from Bayer (formerly known as Lyondel), Newtown Square, Pa., and non-reactive surfactants Tegoglide 435 (polyalkoxy-polysiloxane) available from Goldschmidt Chemical Co. The polyol or non-reactive surfactants may be present in a preferred amount between about 0.01 pph to about 10 pph. Suitable carriers may also be ambiphilic molecules. An ambiphilic molecule is a molecule that has both hydrophilic and hydrophobic segments. The hydrophobic segment may alternatively be described as a lipophilic (fat/oil loving) segment.

A tackifier is also an example of a suitable carrier. A tackifier is a molecule that can modify the time-sensitive rheological property of a polymer product, such as, but not limited to, viscosity. In general a tackifier additive will make a polymer product act stiffer at higher strain rates or shear rates and will make the polymer product softer at low strain rates or shear rates. A tackifier is an additive commonly used in the adhesives industry, that enhances the ability of a coating to create a bond with an object that the coating is applied upon. For additional background regarding tackifiers and tackifier resins, the Handbook of Pressure Sensitive Adhesive Technology, $3^{rd}$ Edition, (Warwick, R.I.) (1999) is incorporated herein by reference, see pages 36, 37, 57–61, 169, 173, 174, and 609–631.

Preferred tackifiers are those classified as a terpene base resin, coumarone base resin, petroleum resin, hydrogenated petroleum resin, styrene resin, phenol resins, or rosin base resin. It is preferred that the tackifiers are nonepoxidized. The rosin base resins include unmodified rosin (e.g., wood, gum, or tall oil) and rosin derivatives. Rosin base resins can be classified by their rosin acids, which are either an abietic acid or a pimaric acid. Abietic acid type rosins are preferred. Rosin derivatives include polymerized rosin, disproportionated rosin, hydrogenated rosin, and esterified rosin. Representative examples of such rosin derivatives include pentaerythritol esters of tall oil, gum rosin, wood rosin, or mixtures thereof.

The terpene base resins include terpene polymers of α-pinene, β-pinene, dipentel, limonene, myrcene, bornylene and camphene, and phenol-modified terpene base resins obtained by modifying these terpene base resins with phenols.

The coumarone base resins include, for example, coumarone-indene resins and phenol-modified coumarone-indene resins.

Petroleum and hydrogenated petroleum resins include aliphatic petroleum resins, alicvclic petroleum resins, aromatic petroleum resins using styrene, α-methylstyrene, vinyltoluene, indene, methylindene, butadiene, isoprene, piperylene and pentylene as raw materials, and homopolymers or copofymers of cyclopentadiene. The petroleum resins are polymers using fractions having a carbon number of 5 to 9 as main components.

The styrene base resins include homopolymers which are low molecular weight polymers comprising styrene as a principal component, and copolymers of styrene with, for example, α-methylstyrene, vinyltoluene, and butadiene rubber.

The phenol base resins include reaction products of phenols such as phenol, cresol, xylenol, resorcinol, p-tert-butylphenol, and p-phenylphenol with aldehydes such as formaldehyde, acetaldehyde and furfural, and rosin-modified phenol resins.

A more preferred tackifier is Uni-tac® R-40 (hereinafter "R-40") available from International Paper Co., Purchase, N.Y. R-40 is a tall oil rosin, which contains a polyether segment., and is from the chemical family of abietic esters. Preferably, the tackifier is present in the composition in an amount between about 0.01 to about 10 parts per hundred, more preferred in the amount between about 0.05 to about 10 parts per hundred. A suitable alternative tackifier is the Escorez series of hydrocarbon tackifiers available from Exxon. For additional information regarding Escorez tackifiers, the specification of U.S. Pat. No. 5,643,665 is hereby incorporated by reference in its entirety. The aforementioned carriers may also be used in combination.

Preferably the adhesion promoter used in combination with the tackifier carrier is a poly(alkoxy)silane. However, the invention is not limited to only a poly(alkoxy)silane adhesion promoter in combination with a tackifier carrier. A preferred poly(alkoxy)silane adhesion promoter is bis(trimethoxysilylethyl)benzene. It is also preferred that the poly(alkoxy)silane adhesion promoter is present in the composition in an amount between 0.1 to 10 pph.

Although the adhesion promoter can be any adhesion promoter that includes a compound with a reactive silane, preferably it is an adhesion promoter as described above (i.e., including a compound containing a cyclic structure interposed between at least two reactive silanes, which are independently alkoxysilanes or halosilanes). Other suitable adhesion promoters are described in U.S. Pat. Nos. 4,921,880 and 5,188,864 to Lee et al., the specifications of which are hereby incorporated by reference.

Reference is made to U.S. patent application Ser. No. 09/476,15 1, filed Dec. 30, 1999, the specification of which is incorporated herein by reference as though fully set forth in its entirety, for a more detailed explanation of the adhesion promoter.

Preferably, primary coating 16 is a soft cushioning layer which preferably has a Young's modulus of less than about 5 MPa. It is also preferred that primary coating 16 is at least about 5 $\mu$m thick, more preferably at least about 25 $\mu$m, most preferably at least about 35 $\mu$m.

An example of one embodiment of a primary coating which includes at least one optical brightener is listed in table A.

TABLE A

|  | Compound | Wt % or pph |
|---|---|---|
| Oligomer | BR3731 (polyether acrylate) | 52% |
| Monomer | Photomer 4003 (ethoxylated phenol acrylate) | 45% |
| Photoinitiator | Irgacure 1850 | 3% |
| Antioxidant | Irganox 1035 | 1 pph |
| Adhesion Promoter | bis(trimethoxysilylethyl)benzene | 2 pph |
| Optical Brightener | Blankophor KLA | 0.1 pph |
| Carrier | Tegorad 2200 (polyalkoxypolysiloxane) | 0.5 pph |

Secondary coating material 18 is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, the specifications of which are hereby incorporated by reference. Various additives that enhance one or more properties of the coating can also be present, including the above-mentioned additives incorporated in the compositions of the present invention.

Typical secondary coatings will include at least one UV curable monomer and at least one photoinitiator. The secondary coating may also include about 0–90 weight percent of at least one UV curable oligomer. It is preferred that the secondary coating is not a thermoplastic resin. Preferably, both the monomer and the oligomer are compounds capable of participating in addition polymerization. The monomer or the oligomer may be the major component of the secondary coating. An example of a suitable monomer is an ethylenically unsaturated monomer. Ethylenically unsaturated monomers may contain various functional groups, which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Cognis Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer Company, Inc.), propoxylated trimethylolpropane triacrylate with propoxylation being 3 or greater, preferably ranging from 3 to 30 (e.g., Photomer 4072, Cognis Corp. and SR492, Sartomer), and ditrimethylolpropane tetraacrylate (e.g., Photomer 4355, Cognis Corp.); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 up) and the like (e.g., Photomer 3016, Cognis Corp.); and single and multi-ring cyclic aromatic or non-aromatic polyacrylates such as dicyclopentadiene diacrylate and dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g., SR339, Sartomer Company, Inc.), and ethoxyethoxyethyl acrylate, single and multi-ring cyclic aromatic or non-aromatic acrylates such as cyclohexyl acrylate, benzyl acrylate, dicyclopentadiene acrylate, dicyclopentanyl acrylate, tricyclodecanvl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

As indicated above, an optional constituent of the secondary coating composition is the oligomeric component. The oligomeric component can include a single type of oligomer or it can be a combination of two or more oligomers. When employed, if at all, the oligomeric component introduced into the compositions of the present invention preferably comprises ethylenically unsaturated oligomers When employed, suitable oligomers can be either monofunctional oligomers or polyfuinctional oligomers, although polyfunctional oligomers are preferred. The oligomeric component can also be a combination of a monofunctional oligomer and a polyfunctional oligomer.

Di-functional oligomers preferably have a structure according to formula (I) below:

$$F_1-R_1-[\text{Diisocyanate-}R_2\text{-Diisocyanate}]_m-R_1-F_1 \qquad (I)$$

where $F_1$ is independently a reactive functional group such as acrylate, methacrylate, acrylamide, N-vinyl amide, styrene, vinyl ether, vinyl ester, or other functional group known in the art; $R_1$ includes independently $-C_{2-12}O-$, $-(C_{2-4}-O)_n-$, $-C_{2-12}O-(C_{2-4}-O)_n-$, $-C_{2-12}O-$ (CO—C$_{2-5}$O)$_n$—, or —C$_{2-12}$O—(CO—C$_{2-5}$NH)$_n$— where n is a whole number from 1 to 30, preferably 1 to 10; R$_2$ is polyether, polyester, polycarbonate, polyamide, polyurethane, polyurea, or combinations thereof; and m is a whole number from 1 to 10, preferably 1 to 5. In the structure of formula 1, the diisocyanate group is the reaction product formed following bonding of a diisocyanate to R$_2$ and/or R$_1$.

Other polyfunctional oligomers preferably have a structure according to formula (II) or formula (III) as set forth below:

$$\text{multiisocyanate-}(R_2\text{—}R_1\text{—}F_2)_x \qquad (II)$$

or

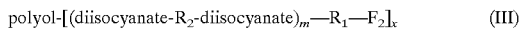

$$\text{polyol-[(diisocyanate-}R_2\text{-diisocyanate})_m\text{—}R_1\text{—}F_2]_x \qquad (III)$$

where F$_2$ independently represents from 1 to 3 functional groups such as acrylate, methacrylate, acrylamide, N-vinyl amide, styrene, vinyl ether, vinyl ester, or other functional groups known in the art; R$_1$ can include —C$_{2-12}$O—, —(C$_{2-4}$—O)$_n$—, —C2-12O—(C$_{2-4}$—O)$_n$—, —C$_{2-12}$O—(CO—C$_{2-5}$O)$_n$—, or —C$_{2-12}$O—(CO—C$_{2-5}$NH)$_n$— where n from 1 to 10, preferably 1 to 5; R$_2$ can be polyether, polyester, polycarbonate, polyamide, polyurethane, polyurea or combinations thereof, x is a whole number from 1 to 10, preferably 2 to 5; and m is a whole number from 1 to 10, preferably 1 to 5. In the structure of formula II, the multiisocyanate group is the reaction product formed following bonding of a multiisocyanate to R$_2$. Similarly, the diisocyanate group in the structure of formula III is the reaction product formed following bonding of a dilsocyanate to R$_2$ and/or R$_1$.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference to describe such syntheses in detail.

When it is desirable to employ moisture-resistant oligomers, they may be synthesized in an analogous, manner, except that the polar polyether or polyester glycols are avoided in favor of predominantly saturated and predominantly nonpolar aliphatic diols. These diols include, for example, alkane or alkylene diols of from about 2–250 carbon atoms and, preferably, are substantially free of ether or ester groups.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

Optical fiber secondary coating compositions may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thickness' of about 25–35 μm is, e.g., less than 1.0 J/cm$^2$, preferably less than 0.5 J/cm$^2$. It is preferred that the secondary coating composition contains about 10–90% of the monomer; of about 0–90% of the oligomer; and about 0.5–10% of the photoinitiator.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical), (2,4,6-trimethylbenzoyl)diphenyl phosphine oxide (Lucerin TPO, available from BASF (Munich, Germany)), ethoxy (2,4,6-trimethylbenzoyl)phenyl phosphine oxide (Lucerin TPO-L from BASF), and combinations thereof. Other photoinitiators are continually being developed and used in coating compositions on glass fibers. Any suitable photoinitiator can be introduced into compositions of the present invention.

In addition to the above-described components, the secondary coating composition of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

A preferred antioxidant is thiodiethylene bis(3,5-di-tert-butyl)-4-hydroxyhydrocinnamate (e.g., Irganox 1035, available from Ciba Specialty Chemical).

A preferred adhesion promoter is an acrylated acid adhesion promoter such as Ebecryl 170 (available from UCB Radcure (Smyrna Ga.)).

Other suitable materials for use in secondary coating materials, as well as considerations related to selection of these materials are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

Reference is made to U.S. patent application Ser. No. 60/173,874, filed Dec. 30, 1999, and Provisional U.S. Patent Application filed Jul. 26, 2000 by Botelho et al., titled Secondary Coating Compositions for Optical Fibers, the specifications of which are incorporated herein by reference as though fully set forth in its entirety, for a more detailed explanation of secondary coatings.

Preferably, secondary coating 18 has a Young's modulus of at least about 50 MPa, more preferably at least about 500 MPa, and most preferably at least about 1000 MPa. In one embodiment of fiber 10, the outer diameter of secondary coating 18 is about 245 μm. It is preferred that the secondary coating is at least 5 μm thick, more preferably at least about 20 μm, and most preferably at least about 25 μm.

Secondary coating 18 can be a tight buffer coating or, alternatively, a loose tube coating. Irrespective of the type of secondary coating employed, it is preferred that the outer surface of secondary coating 18 is not tacky so that adjacent convolutions of the optic fiber (i.e., on a process spool) can be unwound.

One preferred embodiment of the secondary coating is listed in Table B.

TABLE B

| | Compound | Wt % or pph |
|---|---|---|
| Oligomer | KWS4131 (Acrylate urethane oligomer) | 10% |
| Monomer | Photomer 4028 (ethoxylated bisphenol 4) | 82% |
| Monomer | Photomer 3016 (bisphenol A epoxy diacrylate) | 5% |
| Photoinitiator | Irgacure 1850 | 3% |
| Optical Brightener | Blankophor KLA | 0.1 pph |
| Antioxidant | Irganox 1035 (thiodiethylene bis(di-tert-butyl) hydroxyhydrocinnamate | 0.5 pph |

In the case that the inventive coating composition includes an optical brightener, preferably the coating composition will form secondary coating 18.

The optical fibers of the present invention can also be formed into an optical fiber ribbon which contains a plurality of substantially aligned, substantially coplanar optic fibers encapsulated by a matrix material. The matrix material can be made of a single layer or of a composite construction. Suitable matrix materials include polyvinyl chloride as well as those materials known to be useful as secondary coating materials. In one embodiment, the matrix material can be the polymerization product of the composition used to form the secondary coating material.

Briefly, the process involves fabricating glass fiber 10 (core 12 and cladding layer 14), coating the glass fiber with the primary coating composition of the present invention, and polymerizing the composition to form the primary coating material 16. Optionally, a secondary coating composition can be applied to the coated fiber either before or after polymerizing the primary coating. When applied after polymerizing the primary coating, a second polymerization step must be employed. The primary and optional secondary coating compositions are coated on a glass fiber using conventional processes.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary coating and secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the un-cured coating composition on the glass fiber to heat or ultraviolet light or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary coating composition can be applied and cured to form the primary coating material 16, then the secondary coating composition(s) can be applied and cured to form the secondary coating material 18.

It is preferred that inventive coating is at least about 5 μm thick, more preferred at least about 20 μm, most preferred at least about 25 μm thick. Specific embodiments of primary coating 16 may be about 30 μm thick or more. Specific embodiments of secondary coating 18 may also be about 27 μm thick or more. For a coating sample no more than about 35 μm thick, preferably no more than about 30 μm thick, the coating exhibits a transmission of at least 60% of light having a wavelength of more than about 400 nm, more preferably at least 70%, and most preferably at least about 80%. For wavelengths in the range of about 300 to 400 nm, it is also preferred that the inventive coating exhibits a transmission of less than about "y", wherein "y" is calculated in accordance with the following formula:

$$y = -1 \times 10^{-9}\lambda^6 + 3 \times 10^{-6}\lambda^5 - 0.0023\lambda^4 + 1.1035\mu^3 - 295.43\lambda^2 + 42604\lambda - 2 \times 10^6.$$

The variable "λ" is a wavelength in nm between about 300 to 400 nm. Preferably the percent transmission is at least about 5% less than y, more preferably at least about 10% less than y, and most preferably at least about 15% less than y.

In the case that a fiber is coated with at least one inventive coating that includes at least one absorber, preferably the fiber does not exhibit a delta b*, as described in the examples, of more than about 9.75 after the fiber has been exposed to UV light for at least about 800 hours, more preferably no more than about 7.00, and most preferably no more than about 6.00.

In the case that a fiber is coated with at least one inventive coating that includes at least one brightener, preferably the fiber does not exhibit a delta b*, as described in the examples, of more than about 7.50 after the fiber has been exposed to UV light for at least about 1200 hours, more preferably no more than about 5.00, and most preferably no more than about 2.00.

EXAMPLES

The invention will be further clarified by the following examples which are intended to be exemplary of the invention.

Photo-yellowing of Fiber

Control fibers and fiber having at least one coating which included at least an absorber, a stabilizer, or a brightener were exposed to fluorescent lights with 32-watt cool white bulbs. The fibers were exposed to the light under ambient conditions. The lights were approximately 15 feet above the fibers being exposed. The type of fiber tested in each example was SMF-28, available from Coming, Incorporated of Corning, N.Y. The length of each sample of fiber tested was about 400 meters.

The fibers were left undisturbed during the exposure except for periodically being checked for color change using a Minolta CR-300 measuring unit (from Minolta of Ramsey, N.J.). The CR-300 was calibrated to a white ceramic plate before each series of measurements and used to measure the fiber. Color measurements were taken in accordance with the CIELAB color coordinates of the L*a*b* color description system, which uses three values to determine the color change. L* is a lightness variable used to monitor the change in lightness to darkness or vice versa. The values a* and b* are the chromaticity coordinates. The a* is used to designate the change in red to green or vice versa. The b* indicates a change in the region from yellow to blue or vice versa. The change in color was recorded in relation to the change of b* (delta (Δ) b) for at least the reason that a more positive the change in b*, the more intense the yellow color exhibited by the fiber from photo-yellowing. $\Delta b^* = b^*_{measured} - b^*_{initial}$. The color description system is more fully described in the operating manual for the Minolta CR-300 measuring unit, which is incorporated herein by reference in its entirety.

Example 1—Absorbers & Stabilizers

Fiber samples were coated with the primary and secondary coatings listed below in combination as cited in table 1—1. Each fiber sample was drawn at a rate of more than about 15 m/s.

Primary coating A: BR3731, 52% by wt (polyether acrylate); Photomer4003, 45% by wt (ethoxylated phenol acrylate); Irgacure 1850, 3% by wt; Irganox1035, 1 pph; bis(trimethoxysilylethyl)benzene, 2 pph; and Tegorad 2200, 0.5 pph (polyalkoxypolysiloxane)

Primary coating B: BR3731, 52% by wt (polyether acrylate); Photomer4003, 45% by wt (ethoxylated phenol acrylate); Irgacure1850, 3% by wt; Irganox1035, 1 pph; bis(trimethoxysilylethyl)benzene, 2 pph; Tegorad 2200, 0.5 pph (polyalkoxypolysiloxane); and Tinuvin 1130 (0.5 pph)

Primary coating C: BR3731, 52% by wt (polyether acrylate); Photomer4003, 45% by wt (ethoxylated phenol acrylate); Irgacure1850, 3% by wt; Irganox1035, 1 pph; bis(trimethoxysilylethyl)benzene, 2 pph; Tegorad 2200, 0.5 pph (polyalkoxypolysiloxane); Tinuvin 1130 (0.5 pph); and Tinuvin 123 (0.25 pph)

Secondary coating 1: KWS4131, 10% by wt (Acrylate urethane oligomer); Photomer 4028, [87]% by wt (ethoxylated bisphenol 4 diacrylate); Irgacure 1850, 3% (Benzo phosphine oxide); and Irganox 1035, 0.5 pph (thiodiethylene bis( di-tert-butyl) hydroxyhydrocinnamate Secondary coating 2: KWS4131, 10% by wt (Acrylate urethane oligomer); Photomer 4028, 87% by wt (ethoxylated bisphenol 4 diacrylate); Irgacure 1850, 3% (Benzo phosphinie oxide); Irganox 1035, 0.5 pph (thiodiethylene bis( di-tert-butyl) hydroxyhydrocinnamate; and Tinuvin 1130, 0.5 pph

TABLE 1-1

Coating combinations applied to fiber.

| Fiber | Coating Combination | Comments |
|---|---|---|
| 1 | A-1 | Control |
| 2 | A-2 | 0.5 pph Tinuvin 1130 in Secondary Coating |
| 3 | B-1 | 0.5 pph Tinuvin 1130 in Primary Coating |
| 4 | C-1 | 0.5 pph Tinuvin 1130 in and 0.25 pph Tinuvin 123 in Primary Coating |

Figure 2:
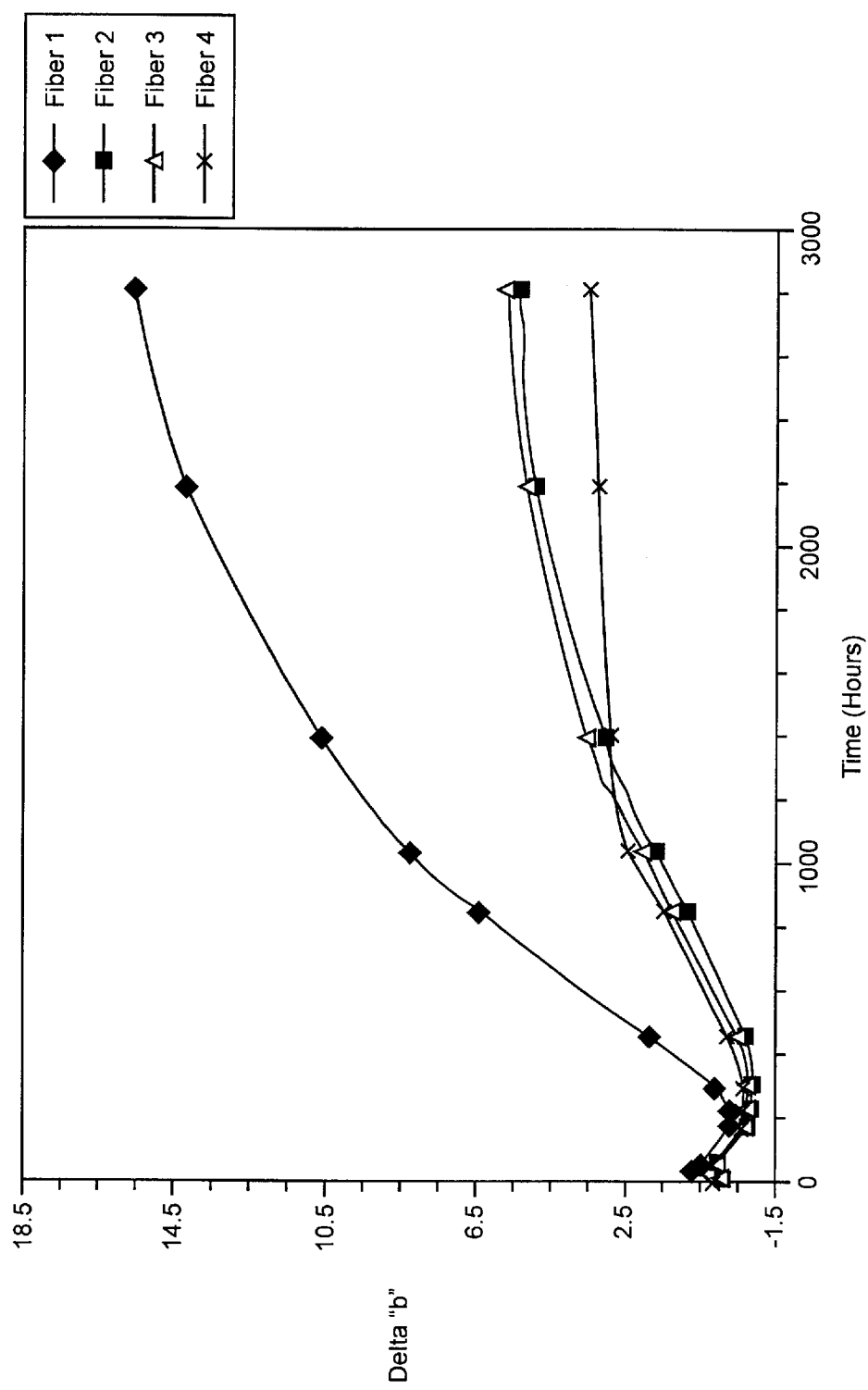
FIG. 2 is a graph of the increase in photo-yellowing of coated optical fibers made in accordance with the invention and a control in terms of delta b* and time.

As shown in FIG. 2, fiber 1, the control, exhibited a much greater photo-yellowing color change than any of the test fibers. The fiber which included the absorber in the primary and the stabilizer in the secondary exhibited the least propensity to undergo a photo-yellowing color change.

Example 2—Optical Brighteners

Figure 3:
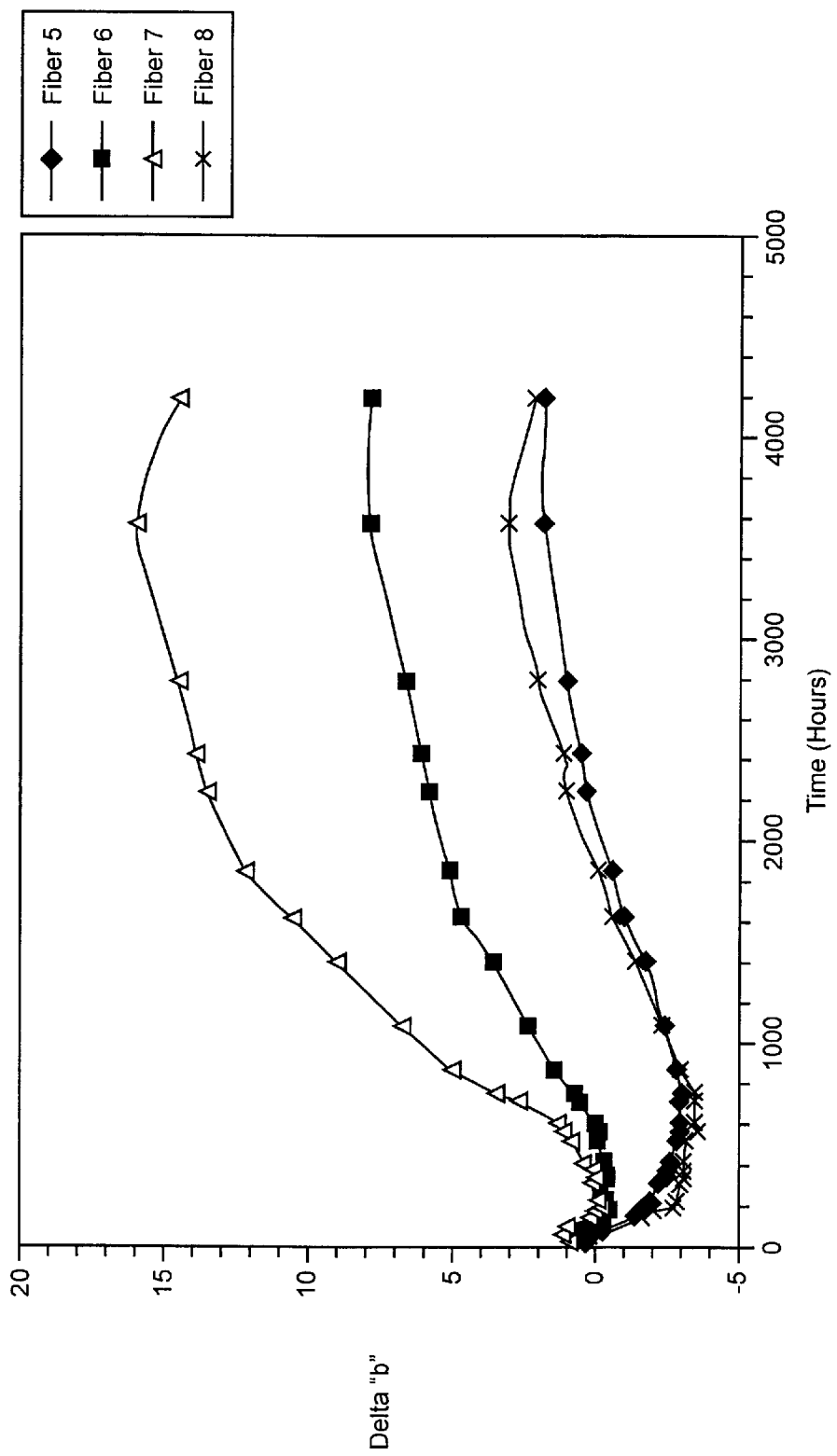
FIG. 3 is a graph of the increase in photo-yellowing of coated optical fibers made in accordance with the invention and a control in terms of delta b* and time.
Figure 4:
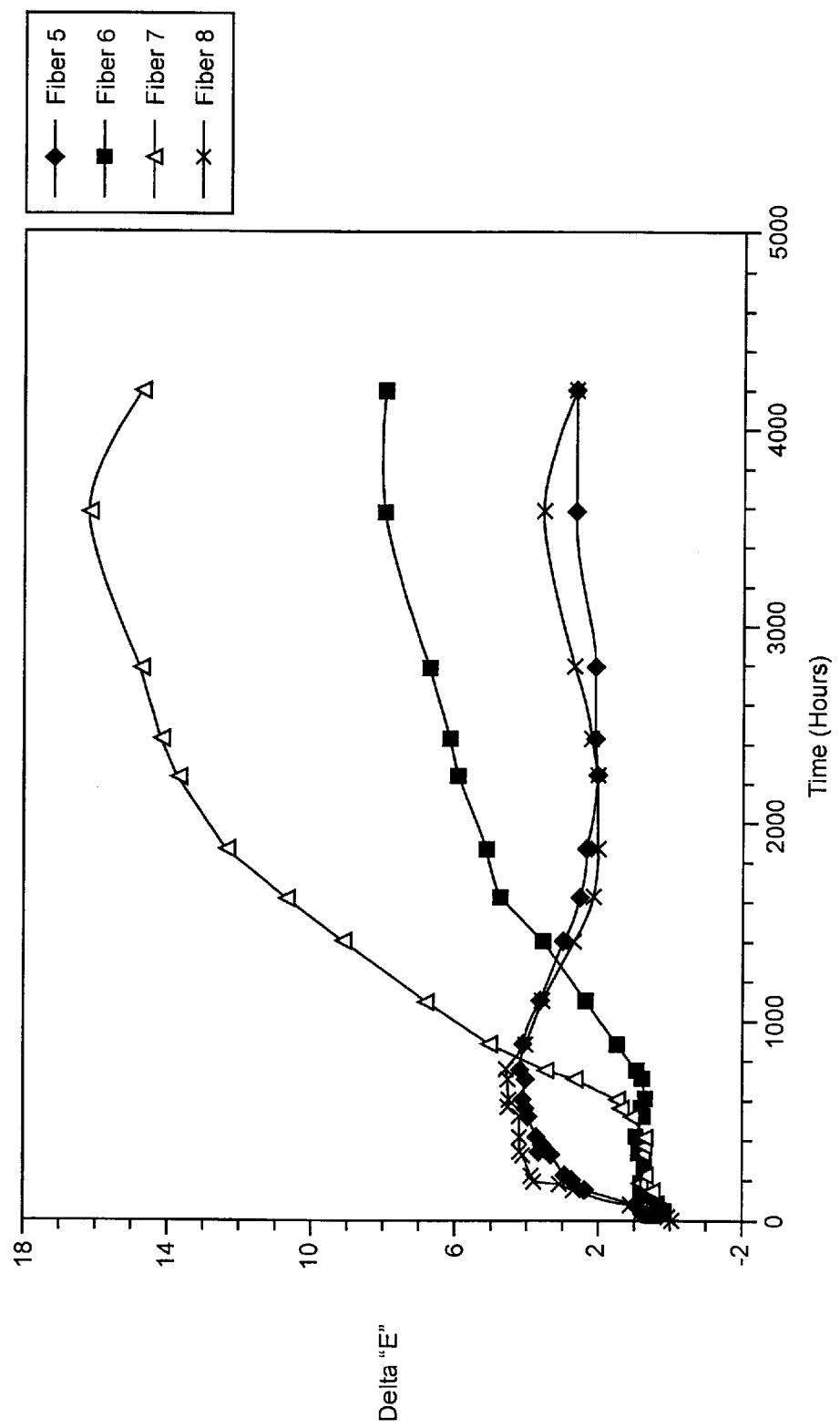
FIG. 4 is a graph of the increase in photo-yellowing of coated optical fibers made in accordance with the invention and a control in terms of delta E and time.
Figure 5:
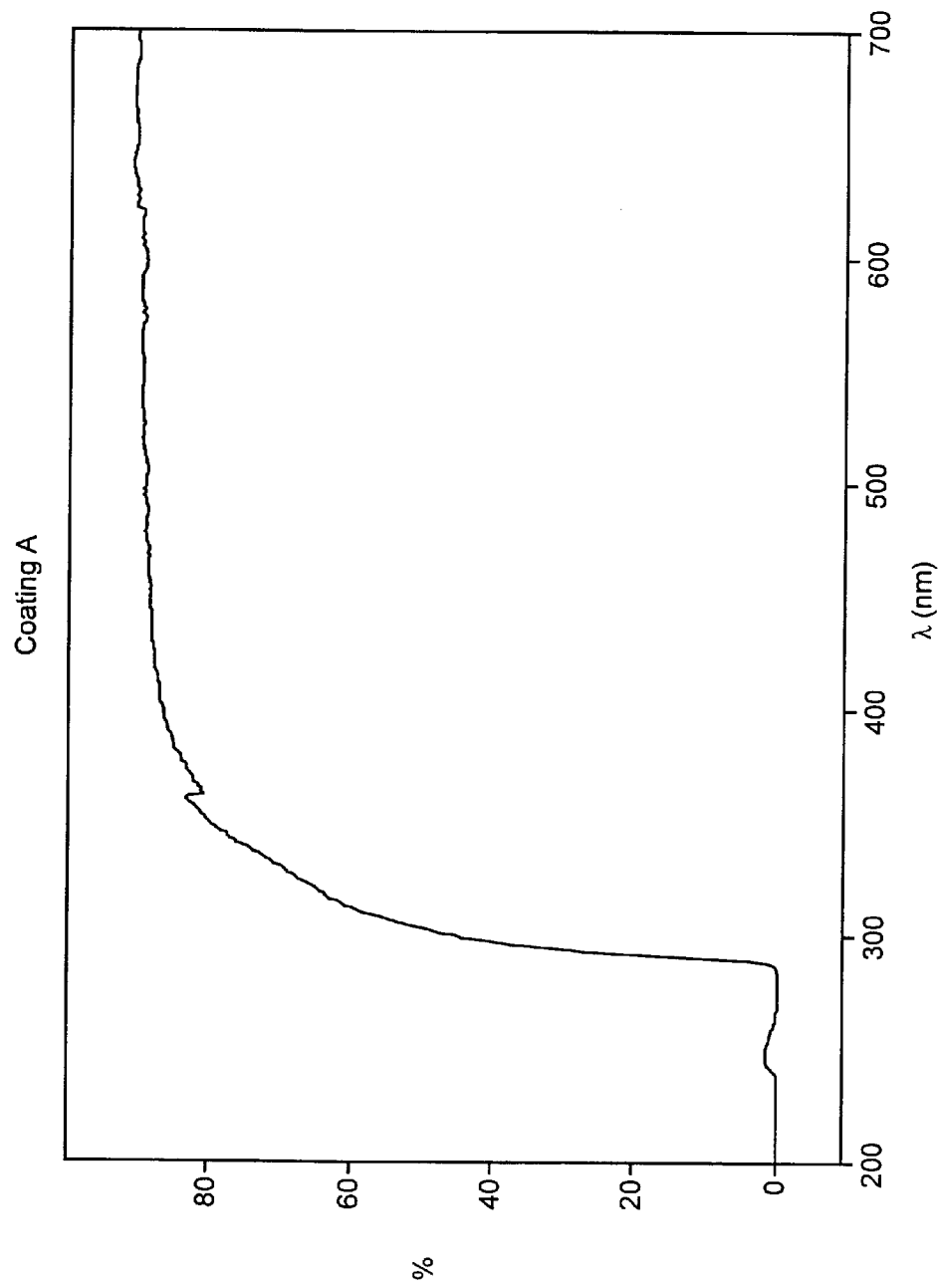
FIGS. 5–10 are graphs of the transmission spectrum of various inventive coatings and two control coatings. Each graph is a plot of the percent transmission vs. wavelength of the light signal.
Figure 6:
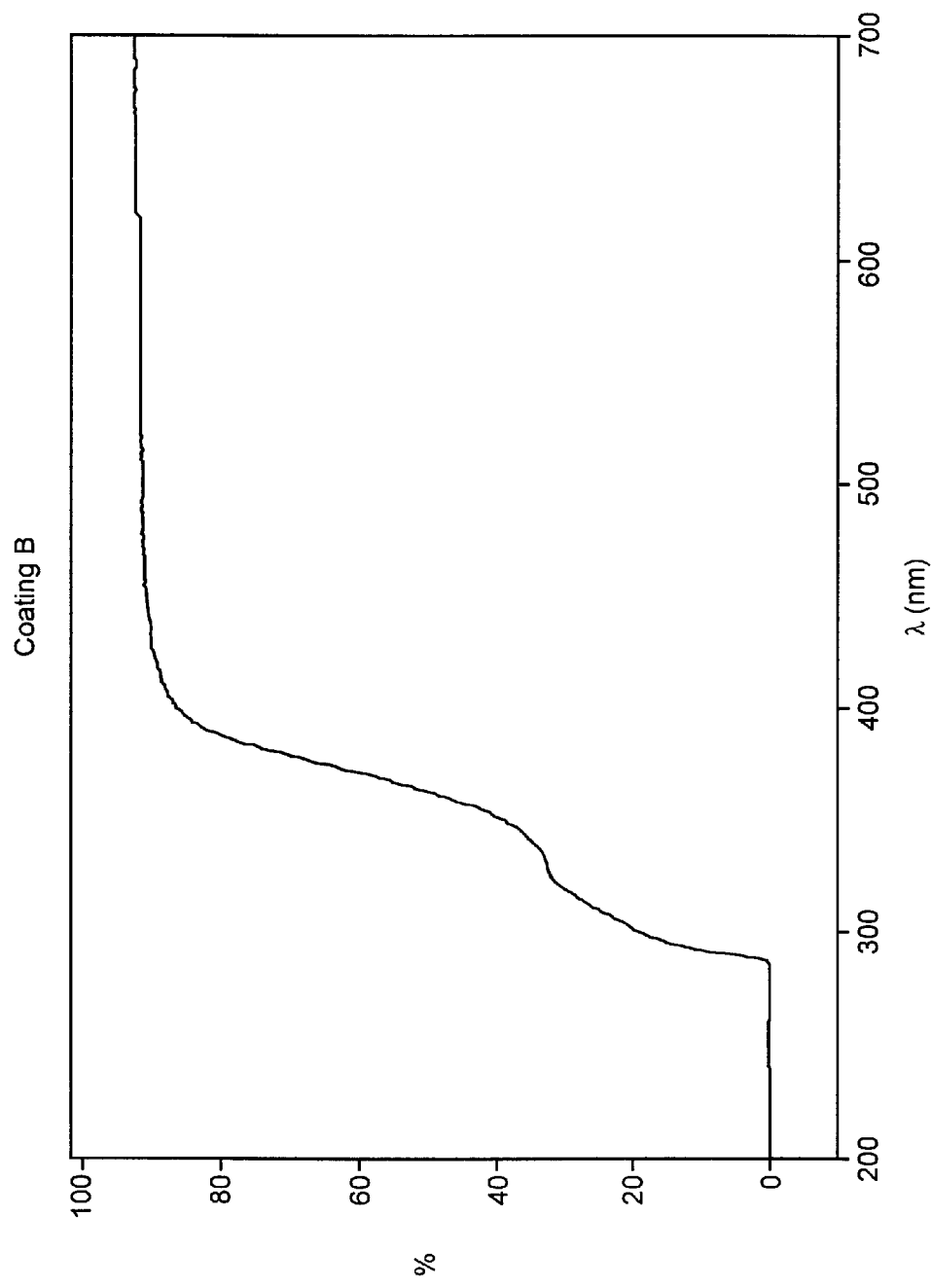
Figure 7:
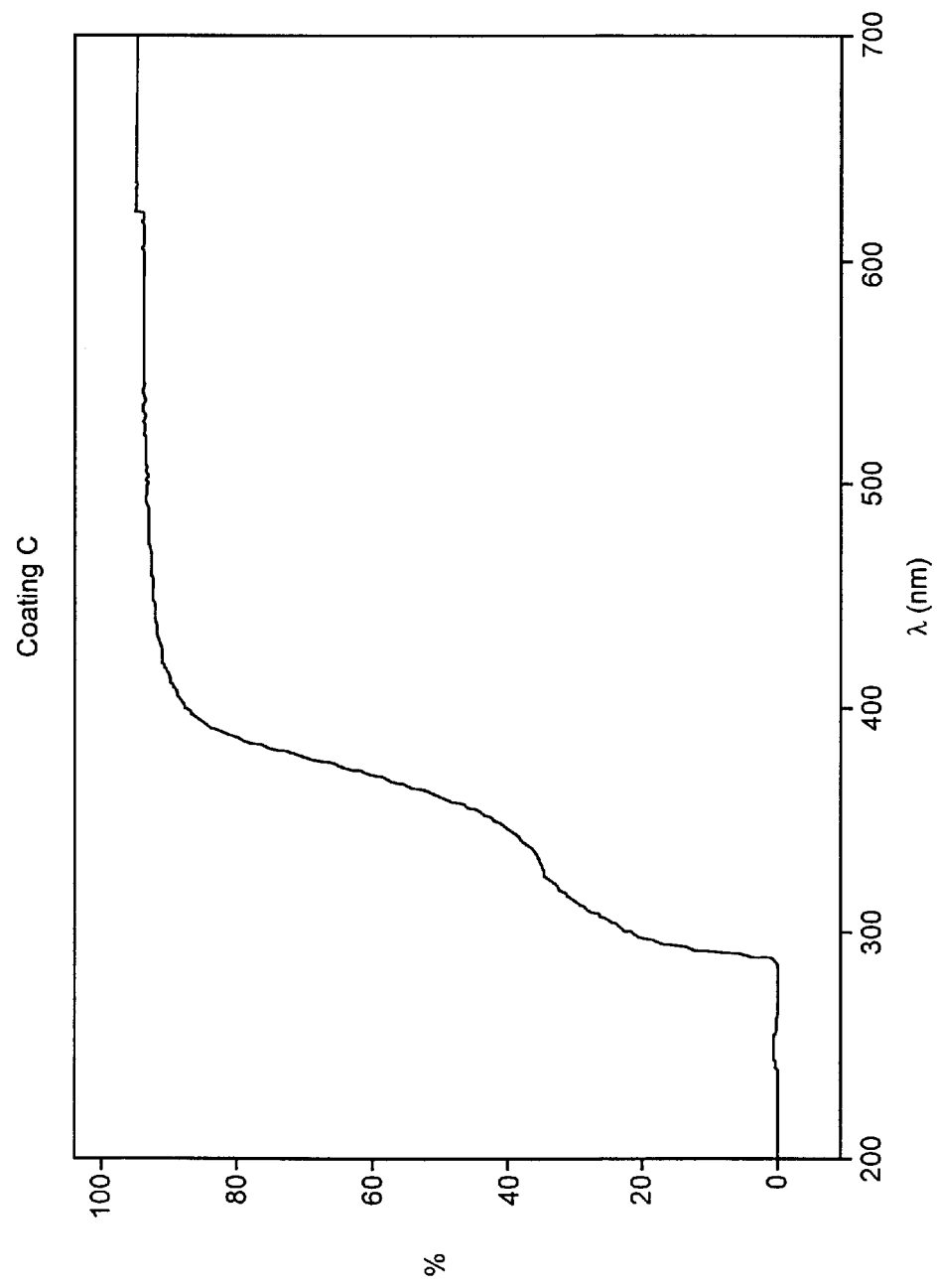
Figure 8:
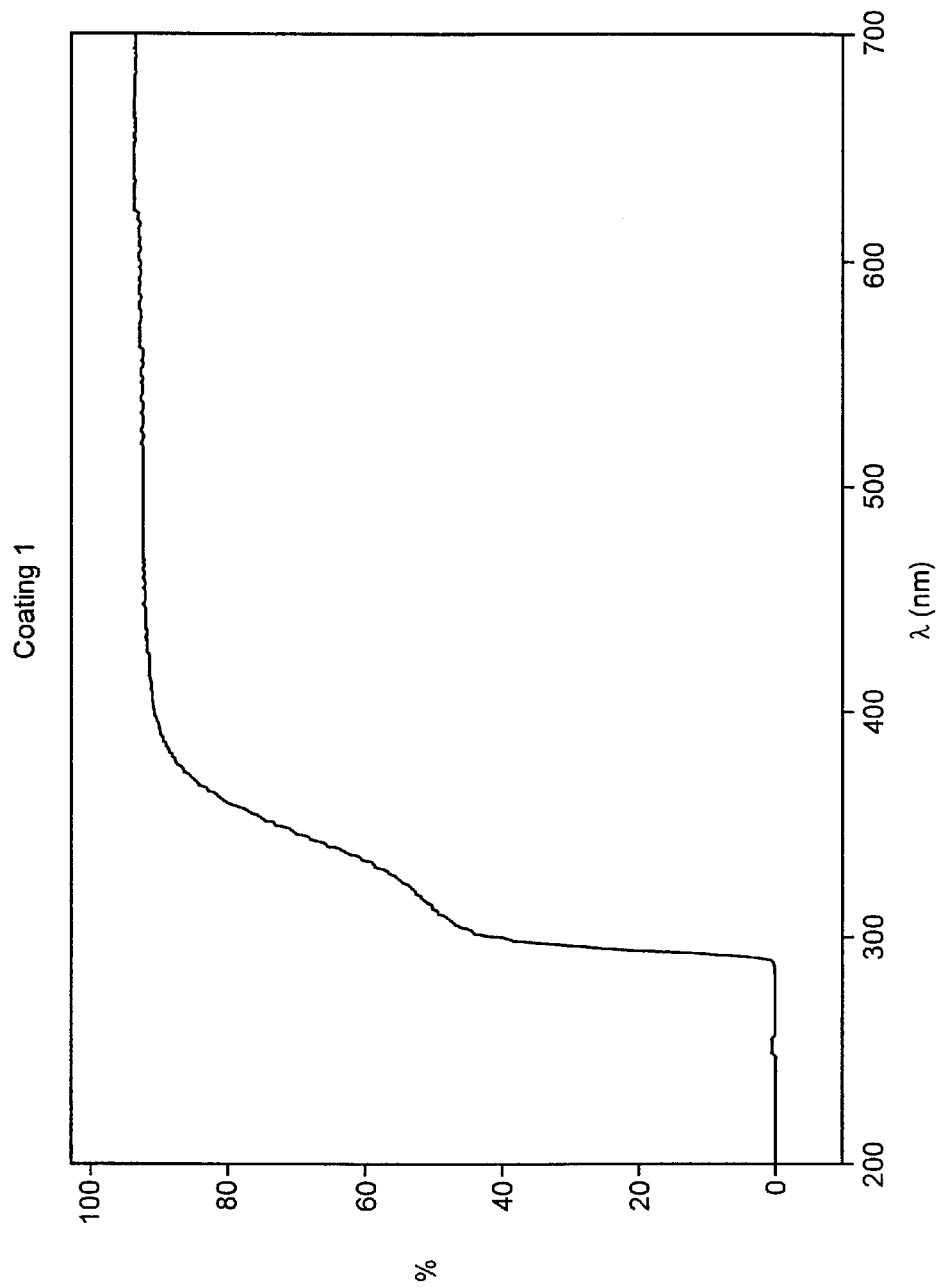
Figure 9:
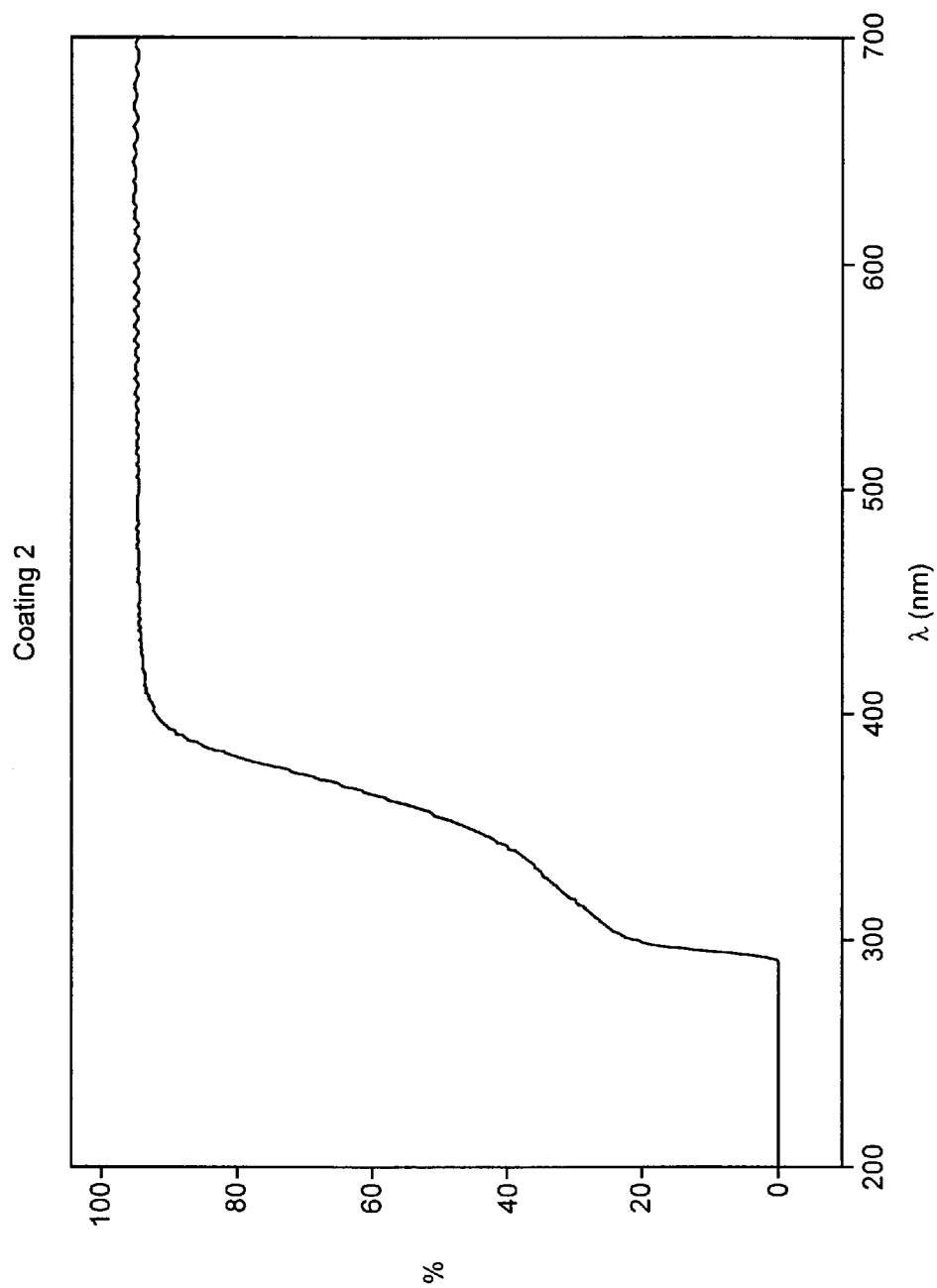
Figure 10:
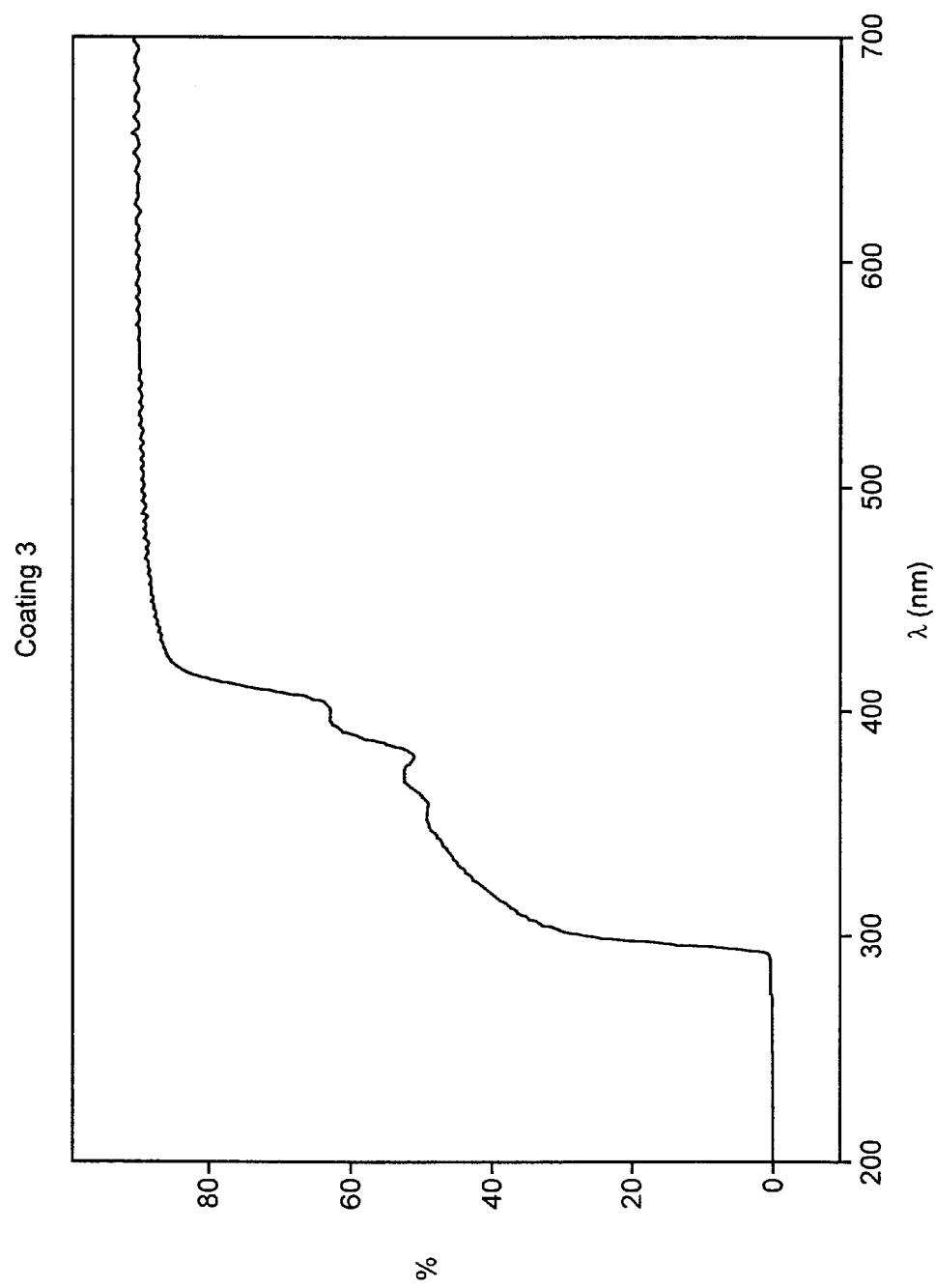

In FIGS. 3 and 4 the delta b* and delta E for fibers coated with a composition that included an optical brightener is shown. The delta b* was determined as described above. Delta E is an expression of the total color change exhibited by the fiber after exposure to UV light as stated above. The total color change was calculated from the initial (time zero) values using the expression $$\Delta E = \sqrt{(\Delta L^{*2} + \Delta a^{*2} + \Delta b^{*2})}.$$

Samples of SMF-28 were coated with the primary and secondary coatings listed below in combination as cited in table 2-1. Each fiber sample was drawn at a rate of more than about 15 m/s. The following coatings were applied to the fiber:

Primary coating D: BR3731, 52% by wt (polyether acrylate); Photomer4003, 45% by wt (ethoxylated phenol acrylate); Irgacure1850, 3% by wt; Irganox1035, 1 pph; bis(trimethoxysilylethyl)benzene, 2 pph; Tegorad 2200, 0.5 pph (polyalkoxypolysiloxane); and Blankophor KLA, 0.1 pph.

Primary coating A: BR3731, 52% by wt (polyether acrylate); Photomer4003, 45% by wt (ethoxylated phenol acrylate); Irgacure1850, 3% by wt Irganiox1035, 1 pph; bis(tritmethoxysilylethyl)benzene, 2 pph; and Tegorad 2200, 0.5 pph (polyalkoxypolysiloxane)

Secondar coating 3: KWS4131, 10% by wt (Acrylate urethane tligomer); Photomer 4028, 87% by wt (ethoxylated bisphenol 4 diacrylate); Irgacure 1850, 3% (Benzo phosphine oxide); Irganox 1035, 0.5 pph (thiodiethylene bis(di-tert-butyl)hydroxyhydrocinnamate; and Blankop6or KLA, 0.1 pph.

Secondary coating 1: KWS4131, 10% by wt (Acrylate urethane oligomer); Photomer 4028, 87% by wt (ethoxylated bisphenol 4 diacrylate); Irgacure 1850, 3% (Benzo phosphinie oxide); and Irganox 1035, 0.5 pph (thiodiethylene bis( di-tert-butyl) hydroxyhydrocinnamate

TABLE 2-1

Coating combinations applied to fiber.

| Fiber | Coating Combination | Comments |
|---|---|---|
| 5 | D-3 | 0.1 pph of Blankophor in Primary and Secondary Coating |
| 6 | A-3 | 0.1 pph of Blankophor in Secondary Coating |
| 7 | A-1 | Control |
| 8 | D-1 | 0.1 pph of Blankophor in Primary Coating |

Fibers coated in accordance with the invention exhibited a clear appearance without any visible yellowing. In comparison, the appearance of the control fiber changed from clear to yellow. The brightener may be included in the primary coating, the secondary coating, or both to inhibit, photo-yellowing of the fiber coatings. Fiber which included the brightener in both the primary and the secondary coating exhibited the most resistance to photo-degradation.

Example 3 Transmission Data

The transmission spectrum of coatings A–C and coatings 1–3 were examined. About a 20 to 30 μm cured sample of each coating was tested. The UV-Visible spectrum for each sample was determined. For coatings A–C and coatings 1 and 2, a Spectronic 1201 (commercially available from Spectronic Instruments, Inc. of Rochester, N.Y.) was used to determine the spectrum at a scan rate of about 100 nm/min with a spectral resolution of about 2 nm. For coating 3, an Agilent 8453 (commercially available from Agilent Technologies of Palo Alto, Calif.) was used to determine the spectrum at spectral resolution of about 1 nm. Each instrument was operated in accordance with the instruction manual for the instrument, which is incorporated herein by reference.

The transmission data for the UV and visible spectrums for each coating are shown in FIGS. 5–10. The coatings which included either an absorber, a stabilizer, a brightener, or combination thereof (coatings B, C, 2, and 3) exhibited greater absorption (lower transmittance) than the control coatings (coatings A and 1). Preferably, the coatings which include at least one absorber, stabilizer, or brightener exhibit a percent transmittance "y" in the wavelength range of about 300 to about 400 of less than about $-1\times10^{-9}\lambda^6+3\times10^{-6}\lambda^5-0.0023\lambda^4+1.1035\lambda^3-295.43\lambda^2+42604\lambda-2\times10^6$, wherein $\lambda$ is a wavelength in the range of about 300 to about 400 nm.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A coated optical fiber comprising:

an optical fiber having at least a core and a cladding; and at least one UV cured coating comprising at least one polymeric component and at least one optical brightener in an amount of between about 0.010 pph and about 0.2 pph, wherein said coating absorbs light of a wavelength of about 450 nm or less and emits said absorbed light at a higher wavelength.

2. The fiber according to claim 1, wherein said higher wavelength is no more than about 550 nm.

3. A coated optical fiber comprising:

an optical fiber having at least a core and a cladding;

a primary coating surrounding and adherent to the cladding, the primary coating having a Young's modulus of less than about 5 MPa and a thickness of at least about 5 μm; and a secondary coating surrounding and adjacent the primary coating, the secondary coating having a thickness of at least about 5 μm, wherein at least one of the primary coating and the secondary coating includes at least one optical brightener, and is substantially devoid of an organic binder.

4. The coated optical fiber of claim 3, wherein the at least one coating absorbs light of a wavelength of about 450 nm or less and emits light at a higher wavelength.

5. The coated optical fiber of claim 4 wherein the coating emits essentially no light at wavelengths greater than about 550 nm.

6. The coated optical fiber of claim 3 wherein the at least one optical brightener includes a benzoxazole derivative.

7. The coated optical fiber of claim 3 wherein an amount of the at least one optical brightener in the coating is between about 0.010 pph and about 0.2 pph.

8. The coated optical fiber of claim 3 wherein the at least one coating has a thickness of at least about 20 μm.

9. The coated optical fiber of claim 3 wherein the optical brightener is in the secondary coating.

10. The coated optical fiber of claim 3 wherein the secondary coating has a Young's modulus of at least about 500 MPa.

11. The coated optical fiber of claim 3 wherein the secondary coating is a tight buffer coating, and is in substantial contact with the primary coating.

12. The coated optical fiber of claim 3 wherein the secondary coating functions as a matrix material for a fiber ribbon.

13. The coated optical fiber of claim 1, wherein the at least one optical brightener includes a benzoxazole derivative.

14. The coated optical fiber of claim 1 wherein the at least one coating is substantially devoid of an organic binder.

15. The coated optical fiber of claim 1 wherein the at least one coating has a thickness of at least about 20 μm.

* * * * *